United States Patent
Swamy et al.

(10) Patent No.: US 11,087,078 B2
(45) Date of Patent: Aug. 10, 2021

(54) SYSTEM AND METHOD FOR REAL TIME DIGITIZATION OF HAND WRITTEN INPUT DATA

(71) Applicant: Tata Consultancy Services Limited, Mumbai (IN)

(72) Inventors: Deepak Swamy, Austin, TX (US); Prashant Mohanan, Kolkata (IN); Piyush Agarwalla, Kolkata (IN); Aniket Roy, Kolkata (IN); Sumanta Saha, Kolkata (IN); Santosh Kumar Mohan, Chennai (IN); Olivia Roy, Kolkata (IN); Ipsita Banerjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 21 days.

(21) Appl. No.: 16/549,902

(22) Filed: Aug. 23, 2019

(65) Prior Publication Data
US 2020/0065362 A1 Feb. 27, 2020

(30) Foreign Application Priority Data
Aug. 23, 2018 (IN) .............................. 201821031669

(51) Int. Cl.
*G06F 3/041* (2006.01)
*G06F 40/171* (2020.01)
(Continued)

(52) U.S. Cl.
CPC .......... *G06F 40/171* (2020.01); *G06F 3/0321* (2013.01); *G06F 3/04162* (2019.05); *G06F 40/174* (2020.01); *G06K 9/222* (2013.01)

(58) Field of Classification Search
CPC .... G06F 40/171; G06F 40/174; G06F 3/0321; G06F 3/04162; G06K 9/222; G06K 9/00402
(Continued)

(56) References Cited

U.S. PATENT DOCUMENTS

| 7,492,946 B2 | 2/2009 | Elder et al. |
| 2005/0219616 A1* | 10/2005 | Furuta .................. G06K 9/2054 358/1.18 |

(Continued)

FOREIGN PATENT DOCUMENTS

EP 1612720 1/2006

*Primary Examiner* — Hassan Mrabi
(74) *Attorney, Agent, or Firm* — Finnegan, Henderson, Farabow, Garrett & Dunner LLP

(57) ABSTRACT

There are many administrative processes which require a user to enter handwritten data on ordinary paper forms. This data is then further processed and converted in the digitized form. In the existing methods, the turnaround time for whole process is high, lacks accuracy of the digitized data, and cost is also on the higher side. A system and method for real time digitization of hand written input data has been provided. The system comprises an input device that utilizes a pen and paper input form which is filled by a user in his hand writing. The completed form data is then transferred to a form inspector application that runs on the aggregation device. It allows for applications to be verified for completeness and send the same for real-time digitization using a form processor application. A recognition engine is then used for the digitization of the hand written input data.

18 Claims, 10 Drawing Sheets

(51) Int. Cl.
*G06F 3/03* (2006.01)
*G06K 9/22* (2006.01)
*G06F 40/174* (2020.01)

(58) Field of Classification Search
USPC .......................................................... 715/268
See application file for complete search history.

(56) References Cited

U.S. PATENT DOCUMENTS

| | | | |
|---|---|---|---|
| 2006/0007189 A1* | 1/2006 | Gaines | G06K 9/222 |
| | | | 345/179 |
| 2009/0173552 A1* | 7/2009 | Elder | G06F 40/171 |
| | | | 178/18.03 |
| 2011/0320924 A1* | 12/2011 | Ratan | G06F 40/171 |
| | | | 715/226 |
| 2014/0368453 A1* | 12/2014 | Yamaguchi | G06F 3/03545 |
| | | | 345/173 |
| 2015/0253851 A1* | 9/2015 | Oh | G06F 3/04883 |
| | | | 345/179 |
| 2017/0108235 A1* | 4/2017 | Guan | G05B 19/042 |
| 2017/0199660 A1* | 7/2017 | Guiavarc'h | G06K 9/00429 |
| 2018/0164890 A1* | 6/2018 | Park | G06F 3/0412 |
| 2020/0082153 A1* | 3/2020 | Holden | G06T 9/005 |

* cited by examiner

SYSTEM AND METHOD FOR REAL TIME DIGITIZATION OF HAND WRITTEN INPUT DATA

PRIORITY CLAIM

This U.S. patent application claims priority under 35 U.S.C. § 119 to: India Application No. 201821031669, filed on Aug. 23, 2018. The entire contents of the aforementioned application are incorporated herein by reference.

TECHNICAL FIELD

The embodiments herein generally relates to the field of digitization of input data. More particularly, but not specifically, the invention provides a system and method for real time digitization of hand written input data.

BACKGROUND

Many administrative and financial processes require a user to enter handwritten data on ordinary paper forms. Handwritten data on paper forms typically requires post processing at a computer, involving scanning, digitizing, recognizing the input image, and processing of the data.

For example in the case of banking industry, a typical application for loan or any other requirement, goes through the legacy back office process, the turnaround time is very high. When the application is filled by a customer, the copies of supporting documents that are required for application processing are also provided. The completed form and supporting documents are then sent to a regional processing center where the application is reviewed for completion. Incomplete applications are resolved by going back to the customer to get the same completed. Completed applications are then transported to a back office where the forms are now manually processed. This process involves scanning the entire application and uploading the images on to a computer system where they are accessed by operators using a workflow tool. Applications that are thus completed by the maker now move to a checker who has to validate the data and then approve the application after which it moves to the customer backend system for approvals/next set of actions.

The costs and impact to the user of the legacy back office processes are very profound. For one, the overall turnaround time has a built-in floor in terms of how much quickly any form can be processed due to the highly manual and batch processing nature of operations. Secondly, it generates a high degree of rework that adds to processing latency because the customer needs to be contacted to make any corrections. Thirdly, the data quality is poor and inaccurate because of its high dependence on manual inspection as a means of improving quality and the limitations of any such process. This also leads to high costs and customer dissatisfaction.

Various solution have been provided in the prior art which involve digitization of hand written input data. Most of these solutions have not attained scaled deployment. The cost of investment in the technology-enabled channel is often too high to allow for financial viability over a reasonable timeframe for microfinance institutions. Because application development and testing are often performed in isolation, there have been problems in integrating the prototype solution into regular microfinance workflows given field and operational constraints. Moreover, clients frequently exhibit a strong preference for maintaining a local paper record for reference, which has dampened the desire for purely electronic data collection systems where no paper trail is left.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for real time digitization of hand written input data. The system comprises an input device, a communication module, an aggregation device, a server and an output module. The input device captures the handwritten input. The input device further comprises of a base pad, a user interface, a pen and an ultrasound receiver. The user interface selects a form template on the input device, wherein the form template is preconfigured as per the user requirements. The pen is attached to the base pad and is used by a user to generate the hand written input data as input data on an input form fixed on the base pad, wherein the input form is fixed on the input device. The ultrasound receiver present in the input device captures a vector input data generated by the movement of the pen on the base pad, wherein the vector input data is corresponding to the hand written input data. The communication module transfers the captured vector input data. The aggregation device communicates with the input device via the communication module. The aggregation device further comprises a form inspector application for verifying the completeness of the input form filled up by the user. The form inspector application further comprises of an encryption module and an upload module. The encryption module encrypts the hand written input data filled on the input form. The upload module uploads the encrypted hand written input data and metadata to a cloud server, wherein the metadata is auto-recognized by the form processor application. The server hosts a form processor application for processing the uploaded input data. The form processor application further comprises of an input template identifier and a processing module. The input template identifier maps the input data to the selected form template. The processing module processes the input data and creates a replica of the input form with handwritten input data as well as a digitized equivalent of the handwritten input data using a recognition engine, wherein the recognition engine is preselected. The output corresponding to the digitized handwritten input data is generated in a user desired format.

In another aspect, the embodiment here provides a method for real time digitization of a hand written input data. Initially, an input form is fixed on an input device, wherein the input device comprising a base pad, an ultrasound receiver and a pen to be used by a user to write on the input form. In the next step, a form template is selected on the input device by the user, wherein the form template is preconfigured as per the user requirements. Further, the hand written input data is captured as an input by filling the input form. In the next step, a vector input data generated by the movement of the pen on the base pad is captured using the ultrasound receiver, wherein the vector input data corresponds to the hand written input data. In the next step, the captured vector input data is transferred to an aggregation device. The completeness of the input form filled by the user is then verified using a form inspector application running on the aggregation device. In the next step, the verified hand written input data filled on the input form is encrypted. In the next step, the encrypted hand written input data and metadata is uploaded to a form processor engine hosted on a server, wherein the metadata is auto recognized by the form processor application. The uploaded input data is decrypted by the form processor application. Further, the input data is then mapped to the selected form template using an input template identifier. In the next step, a replica of the input form with handwritten input data as well as a digitized equivalent of the handwritten input data is created using a processing engine and a recognition engine, wherein the recognition engine is pre-selected. And finally the digitized handwritten input data is saved in a user desired format.

In yet another embodiment, one or more non-transitory machine readable information storage mediums comprising one or more instructions is provided. The one or more instructions when executed by one or more hardware processors causes the one or more hardware processors to perform a method for partitioning of deep convolution network for execution of computationally constraint devices at a network edge, the method comprising a processor implemented steps of fixing an input form on an input device, wherein the input device comprising a base pad, an ultrasound receiver and a pen to be used by a user to write on the input form; selecting a form template on the input device by the user, wherein the form template is preconfigured as per the user requirements; capturing the hand written input data as an input by filling the input form; capturing a vector input data generated by the movement of the pen on the base pad using the ultrasound receiver, wherein the vector input data corresponds to the hand written input data; transferring the captured vector input data to an aggregation device; verifying the completeness of the input form filled by the user using a form inspector application running on the aggregation device; encrypting the verified hand written input data filled on the input form; uploading the encrypted hand written input data and metadata to a form processor engine hosted on a server, wherein the metadata is auto-recognized by the form processor application; decrypting the uploaded input data by the form processor application; mapping the input data to the selected form template using an input template identifier; processing the input data and creating a replica of the input form with handwritten input data as well as a digitized equivalent of the handwritten input data using a recognition engine, wherein the recognition engine is pre-selected; and saving the digitized handwritten input data in a user desired format.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
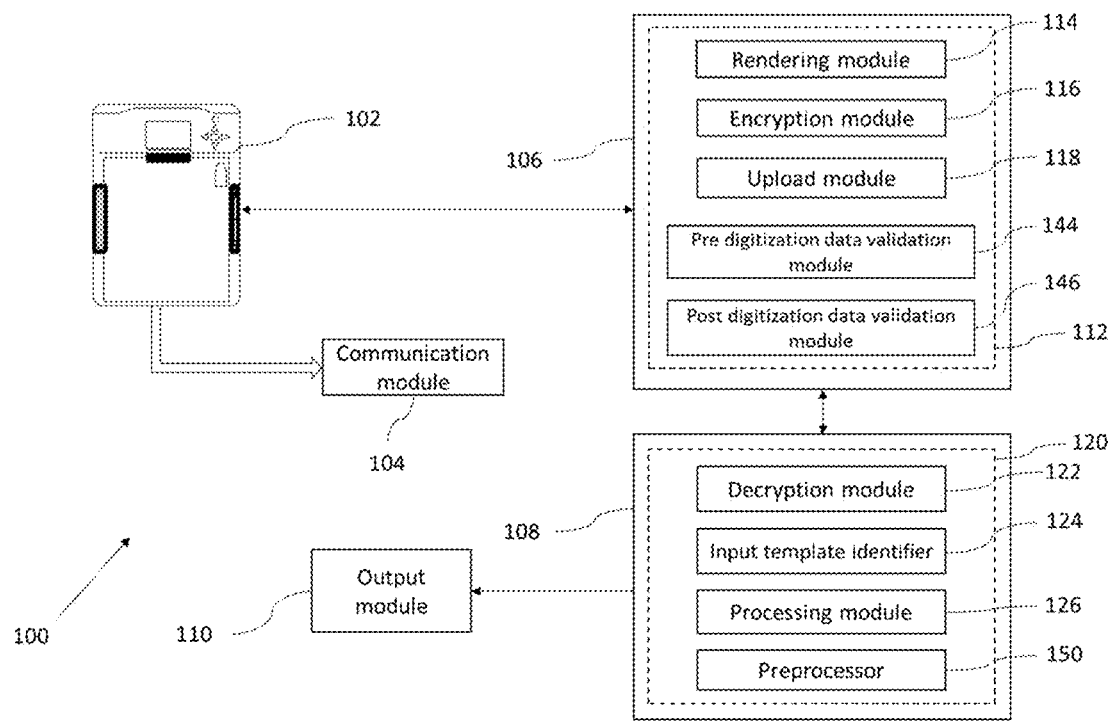
FIG. 1 illustrates a block diagram of a system for real time digitization of hand written input data according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

Figure 2:
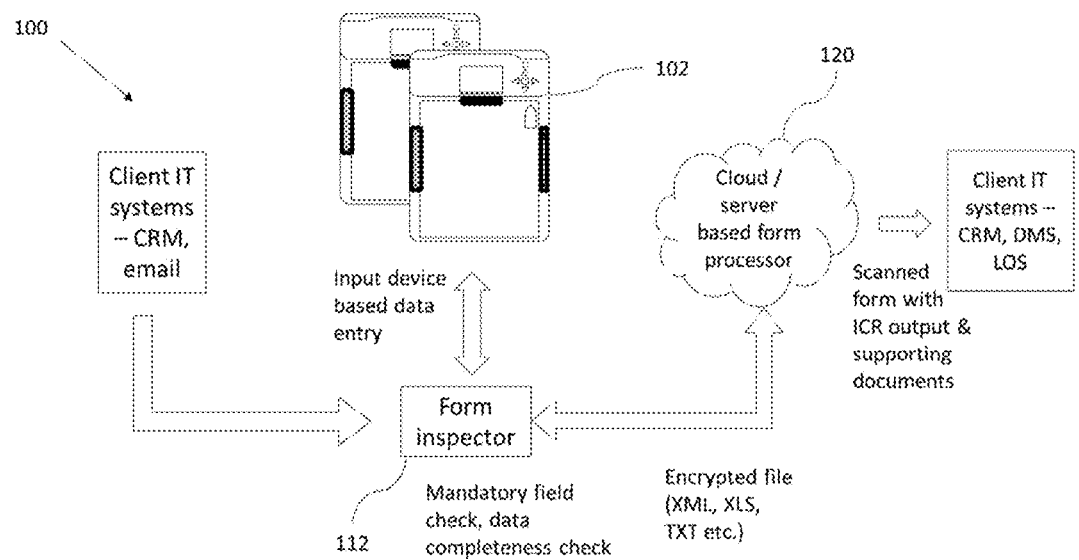
FIG. 2 shows an architectural setup of the system for real time digitization of hand written input data according to an embodiment of the disclosure.

According to an embodiment of the disclosure, a system 100 for real time digitization of hand written input data is shown in the block diagram of FIG. 1 and an architectural setup of FIG. 2. The system 100 is configured to digitize in real time the input data written by a user on any form such as on a bank application form. Further, the digitized input data can also be stored for further utilization. The system 100 is also configured to verify the completeness of the input form filled up by the user. The user can also visualize the digitized input data along with the handwritten data simultaneously on a display screen so that manual correction can also be made. The system 100 results in lower turnaround time, improved data quality and accuracy and lowered total cost of ownership. The digitization is achieved at an equivalent velocity to an all-digital input channel with minimal change and maximum throughput velocity.

According to an embodiment of the disclosure, the system 100 further comprises an input device 102, a communication module 104 and an aggregation device 106, a server 108 and an output module 110 as shown in the block diagram of FIG. 1. Further, the aggregation device 106 can be any processor works in communication with the memory (not shown). In various examples, the aggregation device could be a smartphone, a tablet, a desktop computer or a laptop. The aggregation device 106 further comprises a plurality of modules or applications. The plurality of modules accesses the set of algorithms stored in the memory to perform a certain functions. The aggregation device 106 further comprises a form inspector application 112. The form inspector application 112 comprises a rendering module 114, an encryption module 116 and an upload module 118. The server 108 hosts a form processor application 120. The form processor application 120 comprises a decryption module 122, an input template identifier 124 and a processing module 126.

According to an embodiment of the disclosure, the input device 102 is configured to provide an input data to the system 100. The input data is provided as an input form filled by the user. The input form could be a physical application form. It should be appreciated that the input may also include one or more of a photograph, an image or a biometric data provided along with the input form. Normally, the input form is built based on a set of predefined guidelines like assignment of field control type, type of the box used for the field etc. (viz. partition, isolated, etc.) to ensure improved digitization accuracy. For example, automated minimum spacing check is done to ensure proper filling of forms. The input device 102 may also map the form template and the corresponding page metadata.

Figure 3:
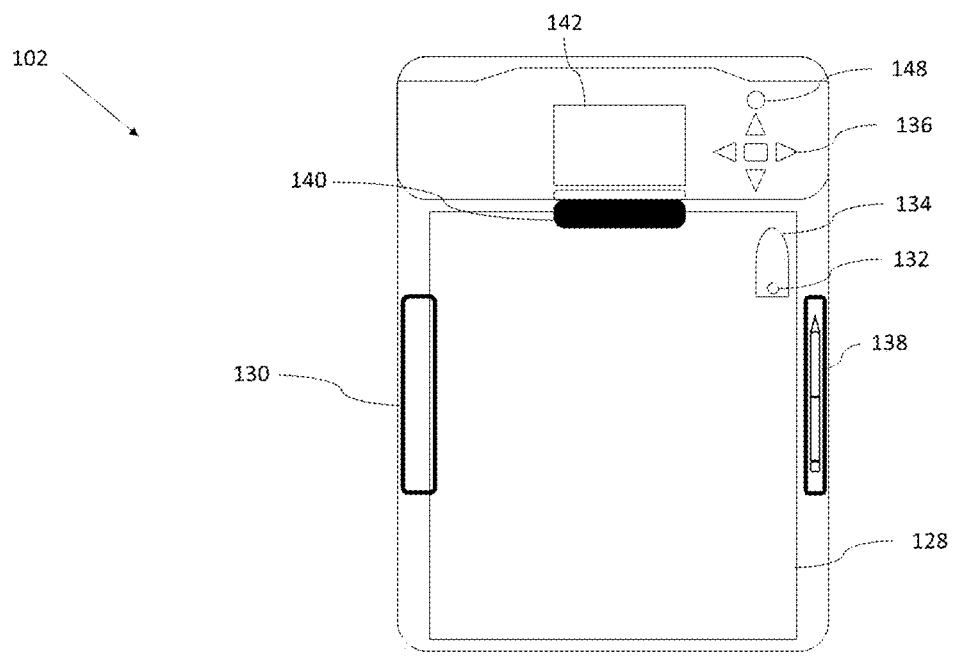
FIG. 3 shows an input device to be used in the system of FIG. 1 according to an embodiment of the disclosure.

The input device 102 further comprises a base pad 128 as shown in FIG. 3. Normally, the base pad 128 is made of plastic. Though it can also be made using any other similar material. The base pad 128 serve as a base for holding a physical application form. The physical paper application form is affixed to the base pad 128 using a spring enabled holding clip 130 and a built in pin 132 or a notch 132 that goes through a corresponding pin-hole that is punched in a pre-assigned location place while writing on it. The input device 102 also comprises a swivel clip 134. The swivel clip 134 can notify the user regarding a page change event.

The input device 102 further comprises a user interface 136. The user interface 136 is configured to select a form template on the input device 102. The form template is preconfigured as per the user requirements. It should be appreciated that the input device 102 can store more than one form template as per the requirements. Before the user starts writing on the application form, an operator selects the form template. The captured handwritten strokes can be uploaded into an internal memory of the input device and can be retrieved based on the requirements. The user interface 136 can also be used for various other purpose related to the input device 102.

According to an embodiment of the disclosure, the input device 102 also comprises a pen 138 and an ultrasound receiver 140 as shown in FIG. 3. The pen 138 is attached to the base pad 128, the pen 138 is configured to be used by the user to generate hand written input data as input data. The pen 138 uses a standard ball-point refill so that the user can write on the physical application form as they normally do while still capturing the vector data (i.e. pen strokes) that are generated as the user writes. In an example, the pen 138 is attached to the side of base pad 128. The ultrasound receiver 140 receives ultrasound signals from the pen 138 as the user writes. The ultrasound receiver 140 in the input device 102 is configured to capture a vector input data generated by the movement of the pen 138 on the base pad 128, wherein the vector input data is corresponding to the hand written input data. Further, the system 100 is paper-agnostic system, i.e. No special quality paper is required for the data capture. Similarly, any size or any type of paper can be used for capturing the data.

According to an embodiment of the disclosure, the input device 102 may also include few other utilities. The base pad 128 of the input device also houses a display panel 142. In an example, the display panel 142 is an LCD screen 142. In another example, the LCD screen 142 may also display a page grid which helps the user to navigate through different pages smoothly with the help of navigation buttons in the user interface 136. Different visual alerts can also be displayed to the user on the LCD screen 142. The display panel 142 can have various uses depending on the operation. In an example, the display panel 142 recreates what the user writes on the application form in real time so that the user is aware of the data being captured and is alerted to any need to increase the pressure on the tip of the pen 138 when writing. The input device 102 also includes a CPU (not shown in figures) for processing and an internal memory (not shown) for processing and storage of the input data. The input device 102 further comprises a rechargeable battery pack that is capable of powering the device subsystem for an extended period of time. The integrated rechargeable battery unit can recharge both the pen and the input device simultaneously.

According to an embodiment of the disclosure, the system 100 also comprises the communication module 104. The communication module 104 can include any appropriate wired and wireless communication interfaces such as Bluetooth, Wi-Fi, USB, etc. for communication to an external device such as the aggregation device 106.

According to an embodiment of the disclosure, the system 100 further comprises the aggregation device 106. The aggregation device 106 is in communication with the input device 102 through the communication module 104. The aggregation device 106 could be a smartphone, a tablet, a desktop computer, a laptop or any other similar device.

According to an embodiment of the disclosure, the aggregation device 106 comprises the form inspector application 112. The form inspector application 112 is configured to verify the completeness of the input form filled up by the user. The verification is an automated process which checks the input form on various parameters such as field completion, unnecessary space, missing page, spelling check etc. The form inspector application 112 further comprises a pre-digitization data validation module 144 and a post digitization data validation module 146. The pre-digitization data validation module 144 is configured to detect missing fields and blank pages on the input form intelligently. In an example, if the system 100 is used for banking application then the form inspector application 112 also enables the user to capture all relevant KYC (Know Your Customer) data from each applicant and to verify and validate completeness of the form thereby minimizing the need for rework. In another embodiment, the form inspector application 112 may also include an image processor (not shown) for enhancing the readability of the captured photograph using one or more image-processing techniques.

According to an embodiment of the disclosure, the form inspector application 112 also comprises the rendering module 114, the encryption module 116 and the upload module 118. The rendering module 114 is configured to render the strokes made by the pen 138. Normally the ultrasound receiver 140 captures the data points. These data points are translated to the user readable characters in user's handwriting using the rendering module 114. These characters could be numbers, alphabet or special characters. The characters are then displayed on the user interface of form inspector application 112.

The encryption module 116 is configured to encrypt the hand written input data filled on the input form. The upload module 118 is configured to upload the encrypted hand written input data and related metadata to the server 108 or the cloud 108. The metadata, which may include, but not limited to ICR engine type, language, template information, etc. is selected by the user using the user interface 136 on the input device 102 in the offline mode or using the I/O interface present on the form inspector application 112 in the online mode. The language of the input data is chosen so that the form processor application 120 could understand the language in which the application form was filled and process the form in the chosen language. In an example, all the input data at rest is AES-256 encrypted and the input data transfer over the internet is accomplished using asymmetric cryptography.

According to an embodiment of the disclosure, the server 108 hosts the form processor application 120. The form processor application 120 is configured to decrypt the vector form of uploaded input data from the server 108 and process the input data. In another embodiment of the disclosure, the form processor application 120 can also run on a desktop or a laptop if the business case warrants the same.

According to an embodiment of the disclosure, the form processor application 120 also comprises of the decryption module 122, the input template identifier 124 and the processing module 126. The decryption module 122 is configured to decrypt the uploaded input data. The input template identifier 124 is configured to map the input data to the selected form template which was chosen using the user interface 136 on the input device 102 in the offline mode, or using the I/O interface present on the form inspector application 112 in the online mode. The processing module 126 is configured to process the input data and create a replica of the input form with handwritten input data as well as a digitized equivalent of the handwritten input data using a recognition engine, wherein the recognition engine is pre-selected. The recognition engine is a built-in Intelligent Character Recognition (ICR) engine. Alternatively, it can be a 3rd party offering too.

The system 100 also comprises the post digitization data validation module 146 in the form inspector application 112. The data can come back to form inspector application 112 post digitization for front end data correction and validation. Many other check post digitization can be applied as per user case. The post digitization data validation module 146 is configured to validate and cleansed the digitized data. The output module 110 is configured to save the digitized handwritten input data in a user desired format such as XML, XLS, TXT, etc. The saved data may also be transmitted to any other place for further processing and completion.

According to an embodiment of the disclosure, a mouse hover field images of user's handwriting can also be made available corresponding to the digitized equivalent of the handwritten input data. The mouse hover field images will help the user to verify the digitized handwritten input data and immediately correct it if needed.

According to an embodiment of the disclosure, the system 100 also comprises an audio visual alarm 148. The audio visual alarm 148 is present on the input device 102 and the aggregation device 106. The audio visual alarm 148 is configured to be activated on the detection of one or more predefined activities. The one or more activities comprises low battery of the input or aggregation device, a missing page from the input form, missing field on the input form or less pressure on the base pad. Any other similar activities can also be added depending on the requirements.

According to an embodiment of the disclosure, the form processor application 120 also includes a preprocessor 150. The preprocessor 150 is configured to pre-process the handwritten input data by performing at least one of noise removal, skew correction or smoothening. The step of preprocessing is performed before the digitization of the input data.

Figure 4A:
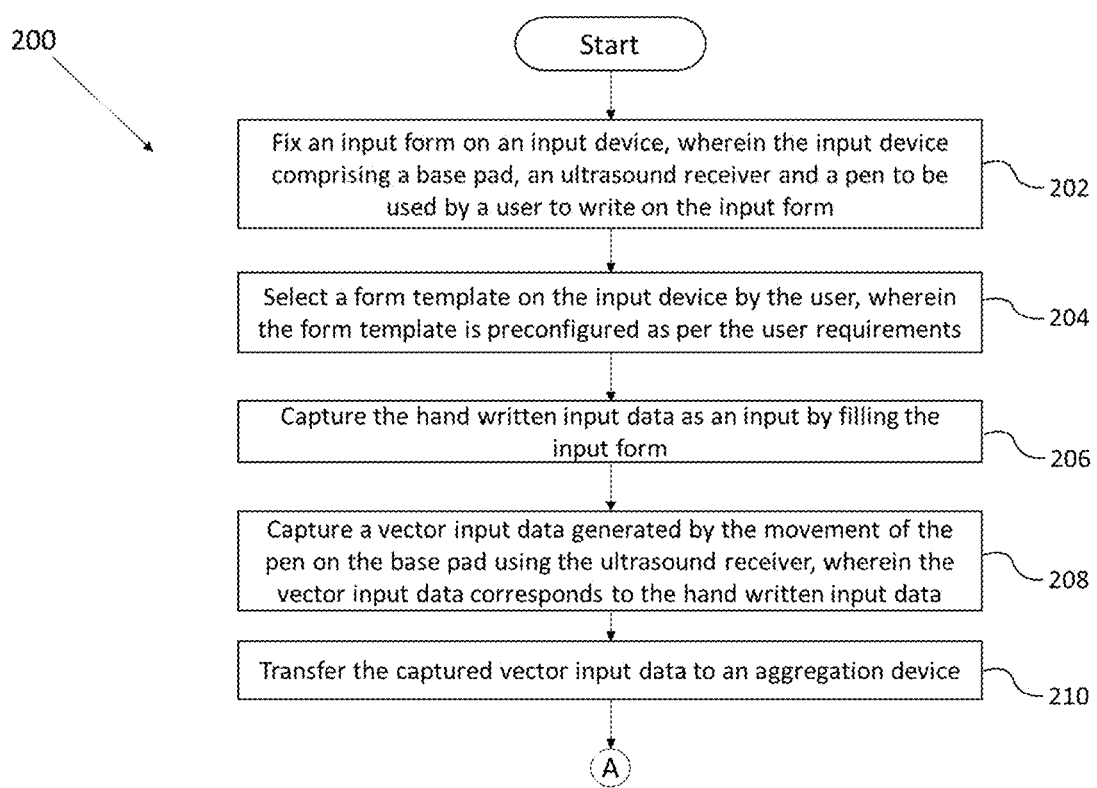
FIG. 4A-4C is a flowchart illustrating the steps involved in real time digitization of hand written input data according to an embodiment of the present disclosure.
Figure 4B:
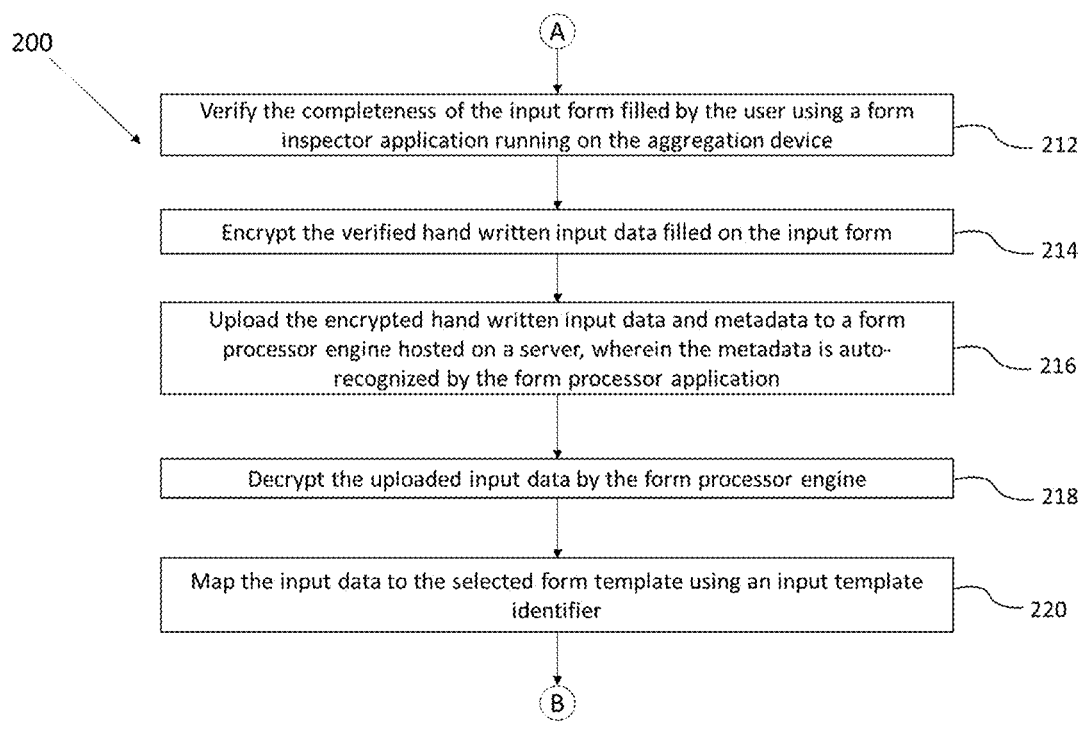
Figure 4C:
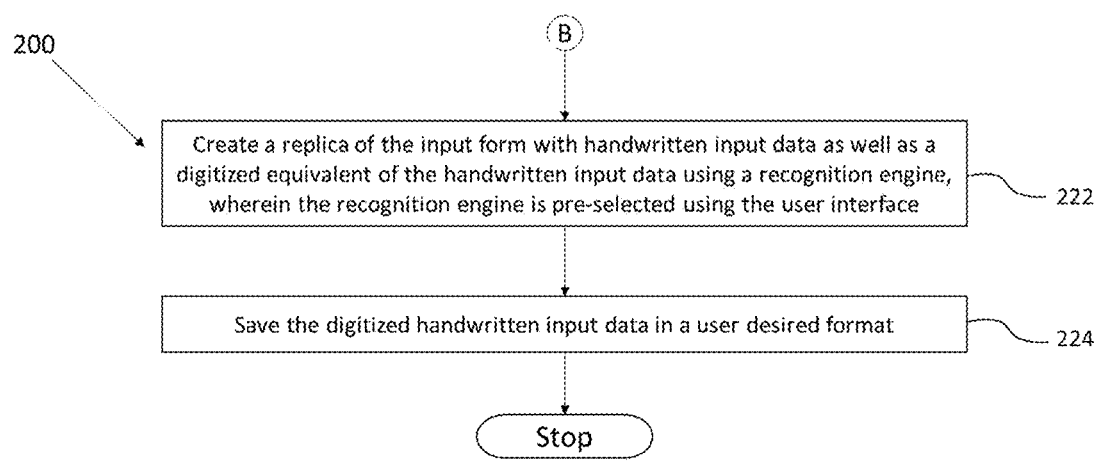

In operation, a flowchart 200 illustrating a method for real time digitization of the hand written input data is shown in FIG. 4A-4C. Initially at step 202, the input form is fixed on the input device 102. The input form is fixed with the help of the holding clip 130 and the notch 132. The input device 102 further comprises the base pad 128, the ultrasound receiver 140 and the pen 138. The pen 138 is be used by the user to write on the input form. In the next step 204, the form template is selected on the input device 102 by the user. The form template is preconfigured as per the user requirements. In the next step 206, the hand written input data is captured as an input by filling the input form. In the next step 208, a vector input data generated by the movement of the pen 138 on the base pad 128 is captured using the ultrasound receiver 140. The vector input data corresponds to the hand written input data.

In the next step 210, the captured vector input data is transferred to the aggregation device 106. At step 212, the completeness of the input form filled by the user is verified using the form inspector application 112 running on the aggregation device 106. The pre-processing data validation is done automatically wherein missing fields, missing pages, etc. are flagged. In addition to that manual verification is also performed. In the next step 214, the verified hand written input data filled on the input form is encrypted. Followed by at step 216, the encrypted hand written input data and the metadata is uploaded to the form processor application 120, wherein the metadata is auto-recognized by the form processor application 120. In the next step 218, the uploaded input data is decrypted by the form processor application 120. Further at step 220, the input data is mapped to the selected form template using the input template identifier 124. The form processor application 120 also processes the input data by removing noise and skew correction before digitization and creating replica of form. In the next step 222, a replica of the input form is created with handwritten input data as well as a digitized equivalent of the handwritten input data using a recognition engine. The recognition engine is preselected. In an embodiment, the data can come back to form inspector application 112 post digitization for front end data correction and validation using the post digitization data validation module 146. Many other check post digitization can be applied as per user case. And finally at step 224, the digitized handwritten input data is saved in a user desired format.

Figure 5:
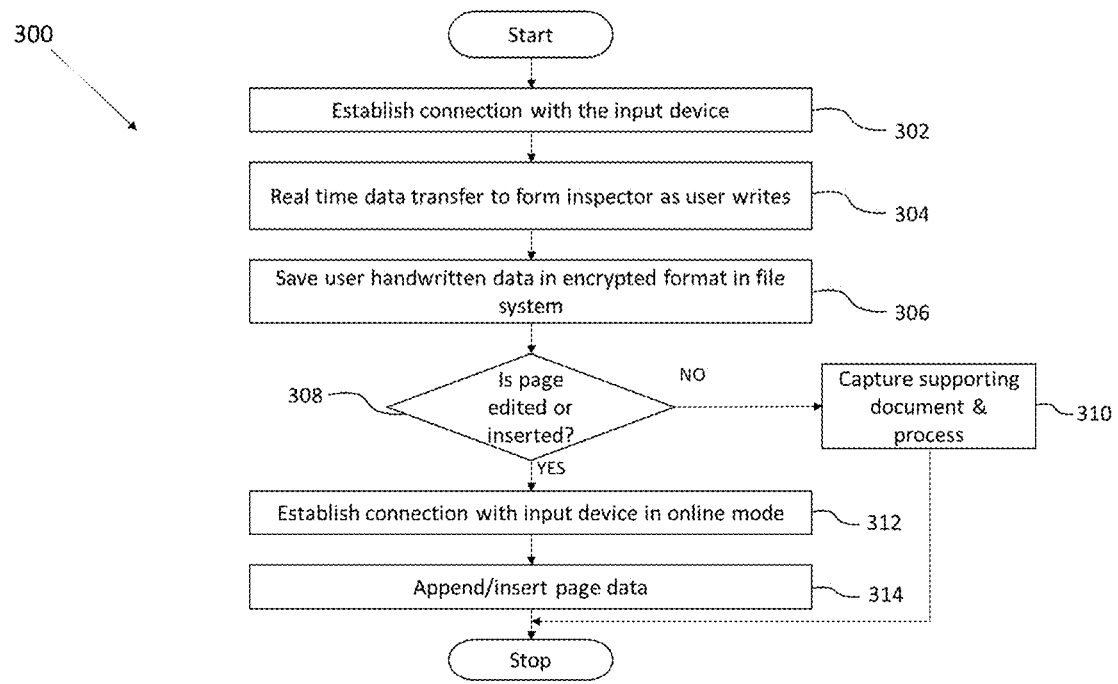
FIG. 5 is a flowchart illustrating the steps involved in one to one mode of operation of the input device according to an embodiment of the present disclosure.
Figure 6:
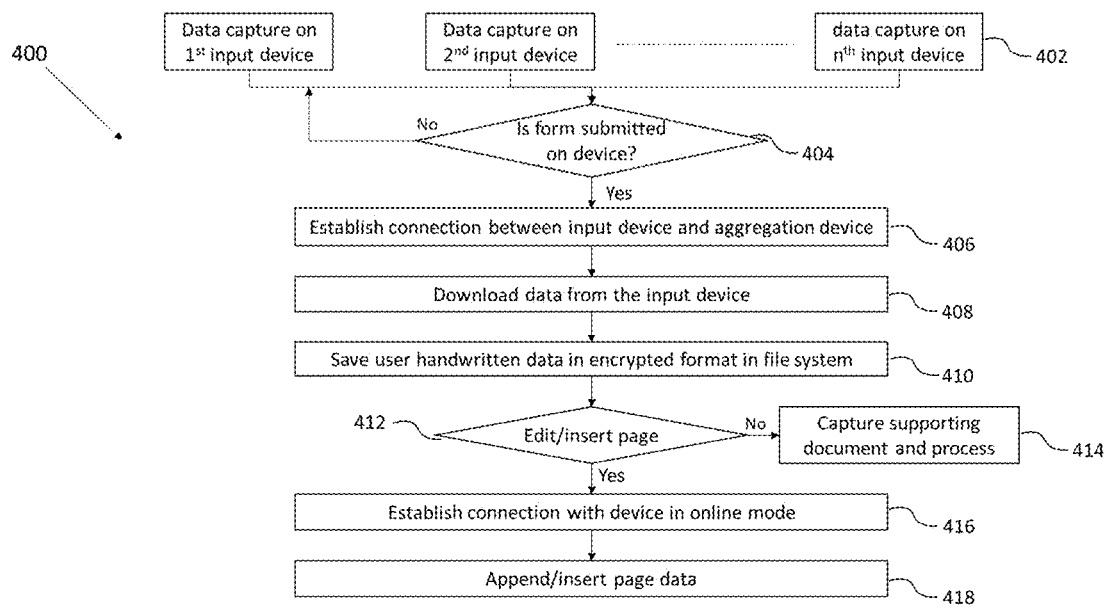
FIG. 6 is a flowchart illustrating the steps involved in one to many mode of operation of the input device according to an embodiment of the present disclosure.

According to an embodiment of the disclosure, the input data capture in the system 100 can be done either in the one to one mode as shown in the flowchart 300 of FIG. 5 or in the one to many mode as shown in the flowchart 400 of FIG. 6. One to many mode is usually performed in the offline mode of operation.

In the one to one mode as shown in the flowchart 300 of FIG. 5, initially at step 302, a connection is established between the input device 102 and the aggregation device 106. At step 304, as the user writes on the input device 102, a real time data transfer happens from the input device 102 to the form inspector application 112 present in the aggregation device 106. At step 306, the user written hand written data is saved in the encrypted format in the file system in the pre-digitized state. The user handwritten data is mapped to the form template selected in the I/O interface (not shown) of the form inspector application 112 present on the aggregation device 106. At the next step 308, it was checked whether there is a new page is inserted or any existing page is edited. If no, then at step 310, any supporting documents are collected and sent for further processing. If yes, then at step 312, the connection remains established with the input device 102 in the online mode. And at step 314, the page is inserted or appended and same process is repeated.

In the other mode of operation, i.e. one to many mode as shown in the flowchart 400 of FIG. 6, initially at step 402, data is captured on more than one input devices 102. At the time of capture, the input devices 102 is not connected to the aggregation device 106. At step 404, once the data is captured it is checked that is the input form is submitted on the input device or not. If yes, then at step 406, a connection is established between the input device 102 and the aggregation device 106. At step 408, the input data is downloaded from the input device 102. At step 410, the user written hand written data is saved in the encrypted format in the file system in the pre-digitized state. At the next step 412, it was checked whether there is a new page is inserted or any existing page is edited. If no, then at step 414, any supporting documents are collected and sent for further processing. If yes, then at step 416, the connection remain established with the input device in the online mode. And at step 418, the page is inserted or appended and same process is repeated.

Figure 7A:
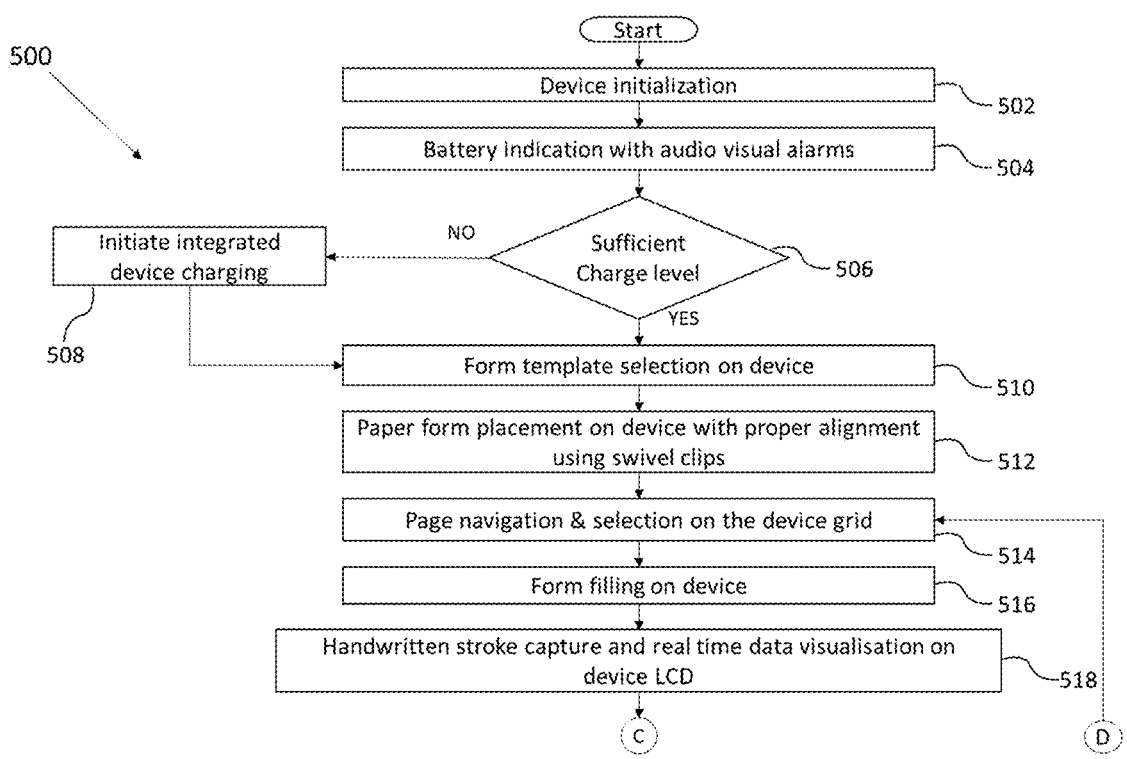
FIG. 7A-7B is a flowchart illustrating the steps involved in capturing of input data in an offline mode according to an embodiment of the present disclosure.
Figure 7B:
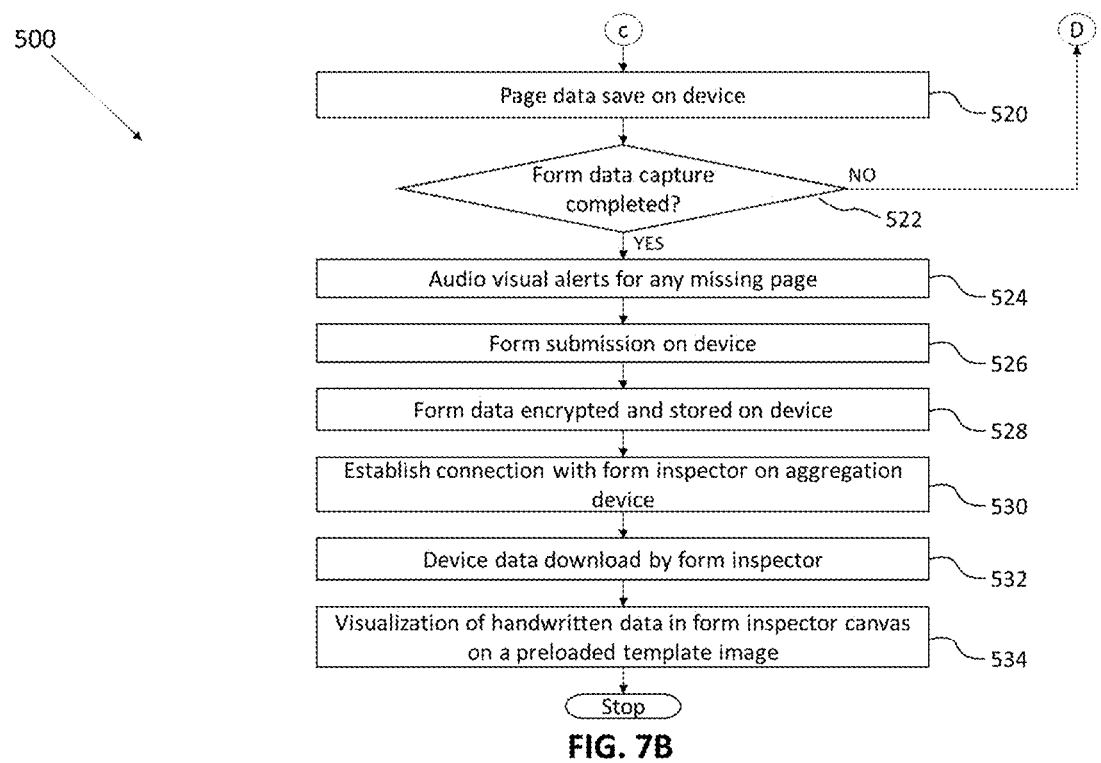

According to an embodiment of the disclosure, the data can be captured in the offline mode also, i.e. the input device 102 is not connected to the aggregation device 106. A flowchart 500 is showing the steps involved in the capturing of data in the offline mode is shown in FIG. 7A-7B. Initially at step 502, the input device 102 is initialized by switching it ON. At step 504, the battery status of the input device 102 is indicated with the help of the audio visual alarm 148. At the next step 506, it is checked whether there is enough charging on the input device 102 or not. If no, then at step 508, the integrated input device charging is initiated. In the next step at 510, the form template is selected by the user using the user interface 136 present on the input device 102. At step 512, the input form is placed on the input device 102 with proper alignment using the holding clip 130 and the notch 132. At step 514, page navigation and selection is done on the input device grid. At step 516, the input form is filled by the user in his handwriting. At step 518, the handwritten strokes are captured by the ultrasound receiver 140 and in the real time, the same is displayed on the LCD screen of the input device 102. At step 520, the data is saved on the input device 102.

At step 522, it was checked whether the input form data capture is complete or not. If no then, again the page navigation and selection is done. If yes, then at step 524 any audio visual alarm may be generated for any missing pages from the input form. At step 526, the input form is submitted on the input device 102. Further at 528, the input form data is encrypted and stored on the input device 102. In the next step at 530, a network connection is established with the form inspector application 112 present on the aggregation device 106. At step 532, the input data is downloaded by the form inspector application 112. And finally at step 534, the handwritten input data is visualized in the form inspector application 112 on the predefined selected template.

According to an embodiment of the disclosure, the system 100 may also comprise a built-in Aadhar module (not shown in Fig.) specifically made for the Indian user's applications. The built-in Aadhar module is configured to capture and process the biometric and retina scan of the user during any document processing related the banking application.

Further, the system 100 is using a mechanism wherein the input data footprint on the input device 102 is very low. Moreover, the data sent from the form inspector application 112 to the form processor application 120 for digitization also has a very frugal footprint.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein solves the problems of higher turnaround time, incomplete forms and poor accuracy of digitized data while filling the big application forms. The disclosure provides a system and method for continuous and real time digitization of hand written input data at an equivalent velocity to an all-digital input channel with minimal change and maximum throughput velocity.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium"

should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method (200) for real time digitization of handwritten input data, the method comprising a processor implemented steps of:
fixing an input form on an input device, wherein the input device comprising a base pad, an ultrasound receiver and a pen to be used by a user to write on the input form (202);
selecting a form template on the input device by the user, wherein the form template is preconfigured as per the user requirements (204);
capturing the handwritten input data as an input by filling the input form (206);
capturing a vector input data generated by the movement of the pen on the base pad using the ultrasound receiver, wherein the vector input data corresponds to the handwritten input data (208), wherein the user is alerted on a display panel (142) present on the base pad, when an increase in pressure on a tip of the pen is needed while writing;
transferring the captured vector input data to an aggregation device (210);
verifying the completeness of the input form filled by the user using a form inspector application running on the aggregation device (212);
encrypting the verified handwritten input data filled on the input form (214);
uploading the encrypted handwritten input data and metadata to a form processor application hosted on a server, wherein the metadata is auto-recognized by the form processor application (216);
decrypting the uploaded handwritten input data by the form processor application (218);
mapping the handwritten input data to the selected form template using an input template identifier (220);
pre-processing the handwritten input data by noise removal, skew correction, and smoothening, using the form processor application;
processing the pre-processed handwritten input data and creating a replica of the input form with handwritten input data as well as a digitized equivalent of the handwritten input data using a recognition engine, wherein the recognition engine is pre-selected (222); and
saving the digitized handwritten input data in a user desired format (224).

2. The method of claim 1 further comprising the step of capturing one or more of a photograph, an image or a biometric data provided along with the input form.

3. The method of claim 1 further comprising the step of building the input form based on a set of predefined guidelines to ensure improved digitization accuracy.

4. The method of claim 1 further comprising the step of generating an audio-visual alarm on the input device and form inspector application running on the aggregation device in case of detection of one or more activities, wherein the one or more activities comprising low battery of the input or aggregation device, a missing page from the input form or missing field on the input form.

5. The method of claim 1, wherein the step of transferring data from the input device to the aggregation device is done using either a wired or a wireless network.

6. The method of claim 1, wherein the aggregation device is at least one of an operating system agnostic smartphone, a tablet, a laptop and a desktop.

7. The method of claim 1 further comprising the step of recreating the handwritten input data on the display screen in real time present on the input device and the form inspector application, for ensuring continuous feedback to the user while writing.

8. The method of claim 1 further comprising the step of creating a mouse hover field images in user's handwriting on the digitized handwritten input data.

9. The method of claim 1 wherein the handwritten input data can be captured between either one to one (300) or one to many (400) mode of data capture.

10. The method of claim 1, where in the step of verifying the input form is done semi-automatically in pre-digitization and post-digitization state.

11. The method of claim 1 further comprising the step of sending the digitized handwritten input data to the form inspector application for data verification and validation using a post digitization data validation module (146).

12. The method of claim 1, wherein the step of providing the handwritten input data is done in one of an online or an offline mode, wherein in the offline mode, the handwritten input data corresponding to one or more form templates is stored on the input device, and then be transferred to the form inspector application in single or batch mode, and wherein in the online mode, the handwritten input data is transferred to the form inspector application in real time.

13. The method of claim 1, wherein the handwritten input data can be digitized locally on the form inspector application wherein the handwritten input data is sent to the form processor application and routed back.

14. The method of claim 1 further comprising the step of notifying the user regarding a page change event using a swivel clip (134).

15. A system (100) for real time digitization of handwritten input data, the system comprises:
an input device (102) for capturing the handwritten input, wherein the input device comprising:
a base pad (128),
a user interface (136) for selecting a form template on the input device, wherein the form template is preconfigured as per a user's requirements,
a pen (138) attached to the base pad, the pen to be used by the user to generate the handwritten input data as input data on an input form present on the base pad, wherein the input form is fixed on the input device, and
an ultrasound receiver (140) present in the input device for capturing a vector input data generated by the movement of the pen on the base pad, wherein the vector input data is corresponding to the handwritten input data, wherein the user is alerted on a display screen present on the input device, when an increase in pressure on a tip of the pen is needed while writing;
a communication module (104) for transferring the captured vector input data;
an aggregation device (106) in communication with the input device via the communication module, the aggregation device further comprising:

a form inspector application (112) for verifying the completeness of the input form filled up by the user, the form inspector application further comprising:
an encryption module (116) for encrypting the verified handwritten input data filled on the input form; and
an upload module (118) for uploading the encrypted handwritten input data and metadata to a server (108);
a a form processor application (120) hosted by the server (108) for processing the uploaded handwritten input data, wherein the form processor application auto-recognizes the metadata, the form processor application further comprises:
a decryption module (122) for decrypting the uploaded handwritten input data;
an input template identifier (124) for mapping the handwritten input data to the selected form template;
a pre-processor (150) for pre-processing the handwritten input data by noise removal, skew correction, and smoothening; and
a processing module (126) for processing the pre-processed handwritten input data and creating a replica of the input form with handwritten input data as well as a digitized equivalent of the handwritten input data using a recognition engine, wherein the recognition engine is preselected; and
an output module (110) for saving the digitized handwritten input data in a user desired format.

16. The system of claim 15, wherein the base pad further comprising a notch (132) to accommodate a pinhole present on a predefined location of the input form.

17. The system of claim 16, wherein the display panel (142) displays in real time whatever the user is writing using the pen.

18. A computer program product comprising a non-transitory computer readable medium having a computer readable program embodied therein, wherein the computer readable program, when executed on a computing device, causes the computing device to:

fix an input form on an input device, wherein the input device comprising a base pad, an ultrasound receiver and a pen to be used by a user to write on the input form (202);
select a form template on the input device by the user, wherein the form template is preconfigured as per the user requirements (204);
capture the handwritten input data as an input by filling the input form (206);
capture a vector input data generated by the movement of the pen on the base pad using the ultrasound receiver, wherein the vector input data corresponds to the handwritten input data (208), wherein the user is alerted on a display panel (142) present on the base pad, when an increase in pressure on a tip of the pen is needed while writing;
transfer the captured vector input data to an aggregation device (210);
verify the completeness of the input form filled by the user using a form inspector application running on the aggregation device (212);
encrypt the verified handwritten input data filled on the input form (214);
upload the encrypted handwritten input data and metadata to a form processor application hosted on a server, wherein the metadata is auto-recognized by the form processor application (216);
decrypt the uploaded handwritten input data by the form processor application (218);
map the handwritten input data to the selected form template using an input template identifier (220);
pre-process the handwritten input data by noise removal, skew correction, and smoothening, using the form processor application;
process the pre-processed handwritten input data and creating a replica of the input form with handwritten input data as well as a digitized equivalent of the handwritten input data using a recognition engine, wherein the recognition engine is pre-selected (222); and
save the digitized handwritten input data in a user desired format (224).

* * * * *